United States Patent [19]

Wright

[11] 4,270,056
[45] May 26, 1981

[54] UNDERSHOT CURRENT MOTOR

[76] Inventor: Oliver D. Wright, 609 Rosedale Ave., Bellefonte, Del. 19809

[21] Appl. No.: 121,803

[22] Filed: Feb. 15, 1980

[51] Int. Cl.³ .............................................. F03B 7/00
[52] U.S. Cl. ....................................... 290/54; 416/85
[58] Field of Search ................................. 290/53–55, 290/42–44; 416/84–86; 60/398

[56] References Cited

U.S. PATENT DOCUMENTS

| 904,892 | 11/1908 | Pattosien | 290/54 |
| 1,780,467 | 11/1930 | Freeze | 416/86 |

FOREIGN PATENT DOCUMENTS 1508796  4/1978  United Kingdom ...................... 416/85

Primary Examiner—J. V. Truhe
Assistant Examiner—Shelley Wade
Attorney, Agent, or Firm—Mortenson & Uebler

[57] ABSTRACT

An undershot current motor is provided wherein a horizontal drive shaft is mounted on a float moored or anchored in moving water, the drive shaft being transverse to the moving water below, the drive shaft having at least two sets of 3-bladed paddle assemblies affixed thereon, wherein the blades are driven by the moving water and power is generated at the drive shaft. This new current motor may be used in tidal water or in continuously moving water, such as a river or stream, to generate power for producing electricity, for example.

8 Claims, 4 Drawing Figures

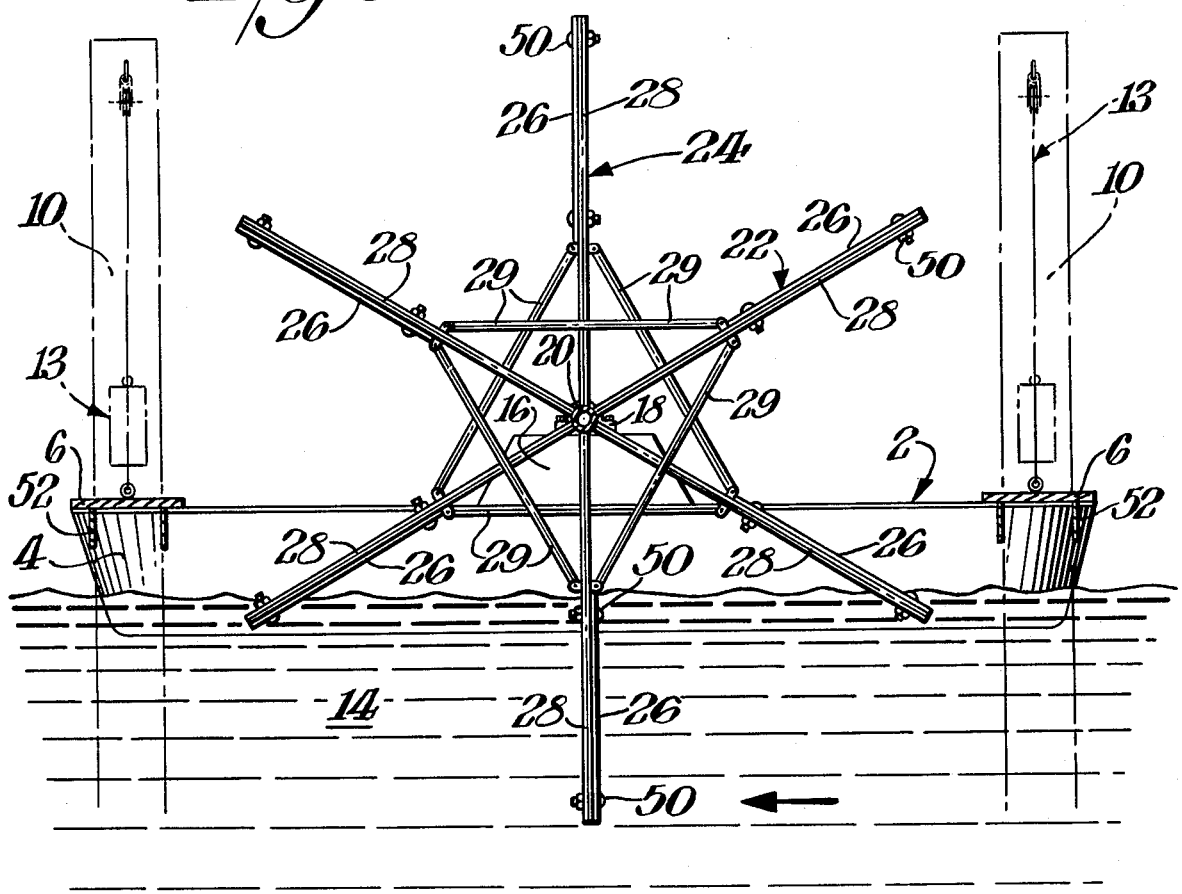
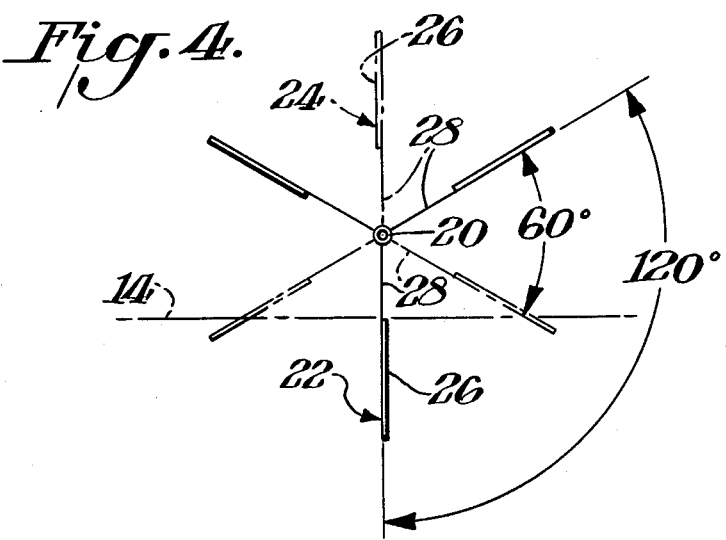

UNDERSHOT CURRENT MOTOR

BACKGROUND OF THE INVENTION

1. Field of the Invention

This invention relates to current motors capable of making use of stream and river water flow as well as tidal water flow for the production of power. The power so produced may be used to produce electricity from a generator or it may be used as mechanical power to convey water and the like via belt or chain mechanisms or the like.

2. Description of the Prior Art

The application of hydroelectric power for the generation of electricity has been known for many years. While usually quite satisfactory, hydroelectric power installations are relatively expensive and require a long lead time to build. Furthermore, they are not always practical except in rivers of certain minimal water flow. In fact, they are not economically feasible for use in many moderate sized streams. Being fixed installations, they are virtually impossible to move and, hence, are virtually useless to meet the requirements of emergency power needs.

In harnessing tidal energy, as opposed to that of river flows, many suggestions have been made over the years. Many of these suggestions have entailed relatively complicated, complex networks of coffer dams, concentrating valves, storage basins and the like, all of which require relatively high expenditures and fixed installations requiring a long lead time.

Water wheels or other overshot paddle assemblies for producing power have long been known, as well as turbine systems wherein the working fluid passes axially through rotating turbine blades.

With the recent renewed interest in energy production arising from the runaway costs of conventional fossil fuels, there has arisen renewed interest in rivers, streams and tides as sources of power. For example, in *The Philadelphia Inquirer* dated June 5, 1973, there appeared an article concerning harnessing the energy of the huge Gulf Stream off the coast of Miami, Fla. Therein it was stated that the Gulf Stream could produce as much electric power as a large nuclear generator. The solution to harnessing such power, according to that article, would be to locate large, slow-turning turbines, like giant underwater windmills beneath the surface. Calculations showed that water flows in the upper layers of the Gulf Stream could produce about 0.8 kilowatt per square meter of stream cross-section or about 25,000 megawatts. If only 4 percent of this power could be extracted, this 1000 megawatts would be equivalent to the output of a large nuclear generating station.

My prior U.S. Pat. No. 3,807,890, utilizes a raceway in which is disposed an inlet gate for concentrating and increasing the velocity of the water flowing through the raceway and also for directing the water to one side of the raceway for engagement with paddles of a vertically disposed water wheel. The inlet gate has a side wall which diverges against the direction of water flow. This side wall, which concentrates the water flowing into the raceway, is pivoted so that it can swing back to a neutral position to permit water flowing out of the raceway to exit freely. A second gate is disposed at the opposite end of the raceway to perform a similar function in the opposite direction through the raceway.

U.S. Pat. No. 1,034,940 discloses a current motor having a supporting frame, cable supporting drums revolubly mounted in the frame, the drums comprising heads each of which consists of a hub having radially extending arms, a series of spokes secured at their inner ends to the arms, annular bands connecting the outer ends of the spokes and segmental plates secured to the bands to form the outer annular surface of the drums, annular channel shaped cable receiving rings secured to the annular surface of the drums, operating cables engaged with the channel shaped rings whereby the drums are operatively connected together and driven, a series of blades having a loose connection with the cables, a braking mechanism adapted to be engaged with one of the drums whereby the speed of the motor is retarded, and a power transmittng gear fixed to the coacting drum whereby the power of the motor may be transferred.

U.S. Pat. No. 2,161,215 discloses a water current motor which included a buoyant body designed to collect and from a sluice-way for the moving water of a stream and which is capable of being moored or moved from place to place in a stream.

An object of the present invention is to provide an improved apparatus for utilizing the energy of flowing water, including stream, tide and river flows.

Another object of this invention is to provide an improved apparatus for utilizing the energy of flowing water, which apparatus is capable of being moved easily from location to location to supply, for example, energency power needs.

Still another object is to obviate many disadvantages of prior water-energy systems.

SUMMARY OF THE INVENTION

An undershot current motor is provided comprising:

a float or barge adapted to be moored on the surface of moving water and having an opening vertically through the center thereof, support means on the float for supporting a horizontal, rotatable drive shaft above the water over said opening, the drive shaft extending transversely to the direction of water flow.

a horizontal drive shaft rotatably supported above the water by said support means, at least two sets of 3-bladed paddle assemblies affixed to the drive shaft, each paddle assembly comprising 3 blades and each blade extending lengthwise along the drive shaft and radially outwardly from the drive shaft, each blade in each assembly being positioned substantially 120 degrees from each other blade, and the blades in each set being positioned so that they bisect the angles formed by the blades in an adjacent set, the blades extending through the opening and into said water during a portion of each revolution of the paddle assemblies and drive shaft, the drive shaft being connected to, in appropriate sequence, an optional gear box, an optional electrical generator, and thence to a power take-off device such that, when moored or anhored on moving water, the water causes the paddle assemblies and drive shaft to rotate, thereby generating power at the power take-off.

The paddle assemblies are preferably each comprised of struts affixed to the drive shaft and extending outwardly therefrom and having paddle blades affixed to the outer ends of the struts.

The current motor of this invention may be used to generate power from streams, tidal water or river flows.

Use of this motor in the Gulf Stream is specifically contemplated.

Electrical power may be generated or mechanical power may be generated, for example for moving water for irrigation, using the current motor of this invention.

BRIEF DESCRIPTION OF THE DRAWINGS

FIG. 3 is a side elevational view of the current motor of this invention taken along the line 3—3 of FIG. 2.

FIG. 4 is a diagramatic sketch of the end view of the current motor of this invention showing the angular relationship between the blades.

DETAILED DESCRIPTION OF THE INVENTION WITH REFERENCE TO THE DRAWINGS

An undershot current motor is provided wherein a horizontal drive shaft is mounted on a float moored or anchored in moving water, the drive shaft being transverse to the moving water below, the drive shaft having at least two sets of 3-bladed paddle assemblies affixed thereon, wherein the blades are driven by the moving water and power is generated at the drive shaft. This new current motor may be used in tidal water or in continuously moving water, such as a river or stream, to generate power for producing electricity, for example.

Figure 1:
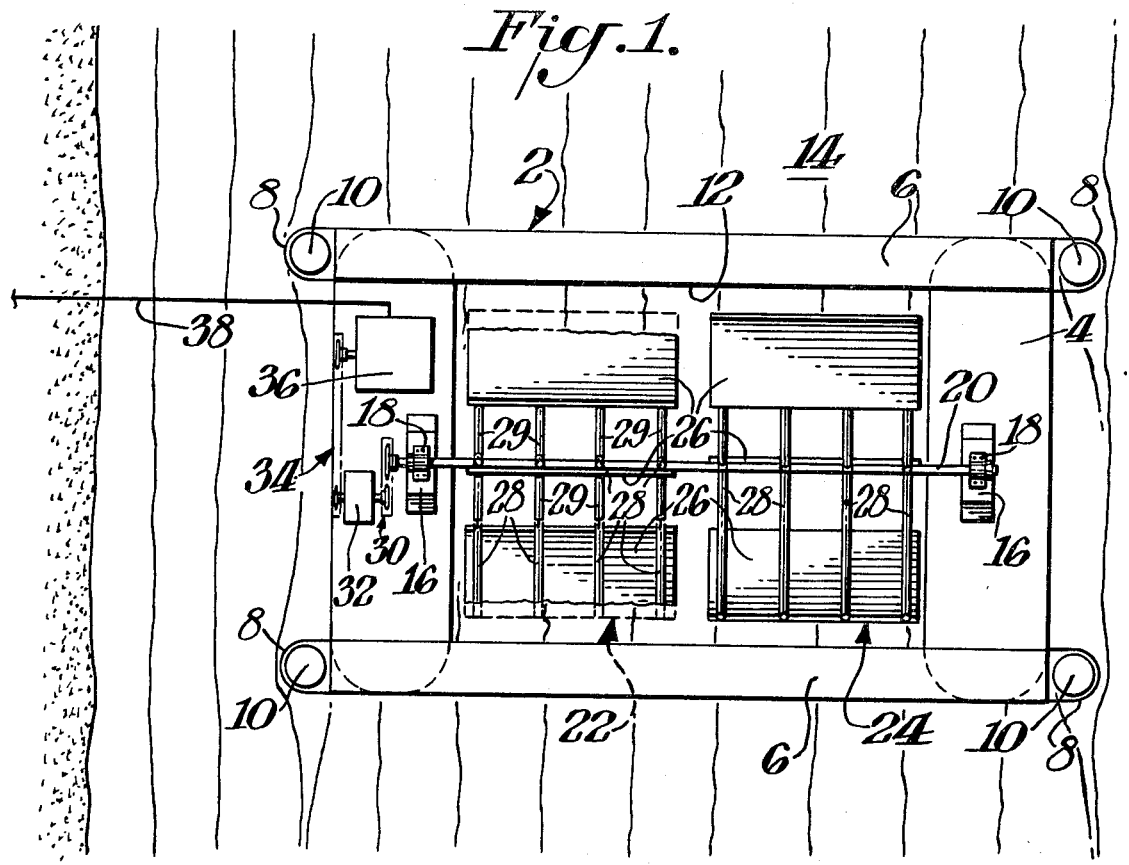
FIG. 1 is a top plan view of the current motor of this invention.

Details of this invention can best be understood with reference to the accompanying drawings. In FIG. 1, in top plan view, is shown a float 2 for supporting the invention on the surface of moving water 14. The specific direction of motion of the water is immaterial, for the current motor will operate in either direction.

The float 2 has pontoons 4 at either end. The specific float shown is convenient but it will be appreciated by one skilled in the art that many other floats or barges or the like may be employed without deviating from the gist of this invention. Mooring pilings 10 and securing collars or chains 8 are shown as a means for holding float 2 stationary on the surface of the moving water. Other means may be used such as anchors, shorelines and the like, and this will be apparent to one skilled in this art.

Mounted on supports 16 on float 2 is a drive shaft 20. This drive shaft is rotatable in bearing assemblies 18 and extends over opening 12 in float 2 in a direction transverse to the direction of flow of the water.

The drive shaft 20 is shown driving, through chain drive 30, optional gear box 32, and thence, through chain drive 34, optional electric generator 36. Power cable take-off 38 can be used to transmit electric power from generator 36 to shore or to an adjacent barge or the like. Such system is preferred for certain applications but it will be clear to one skilled in the art that many other mechanisms for transmitting the power generated at the drive shaft 20 to the point of use may be utilized without deviating from the gist of this invention. For example, a reversible gear box 32 can be used in tidal waters, to generate power regardless of the direction of the tides.

Energy from the flowing water is transmitted to power the drive shaft 20 by means of a first set of 3-bladed paddle assemblies 22 and a second set of 3-bladed paddle assemblies 24 mounted adjacent each other on drive shaft 20. Each such paddle assembly comprises 3 blades, each affixed to drive shaft 20 and each blade extending lengthwise along the drive shaft 20 and radially outwardly from the drive shaft. Each blade in each assembly is positioned substantially 120 degrees from each other blade which is evident from FIG. 3, to be discussed in detail hereinbelow.

Returning to FIG. 1, in a preferred embodiment, each such blade comprises a paddle blade 26 affixed to struts 28 which in turn are affixed to drive shaft 20. Support struts 29, better seen in FIG. 3, impart rigidity to each blade.

The blades extend outwardly from drive shaft 20 and through the opening 12 and into the moving water below the float 2. The moving water pushes th blades 26 and causes rotation of drive shaft 20.

Figure 2:
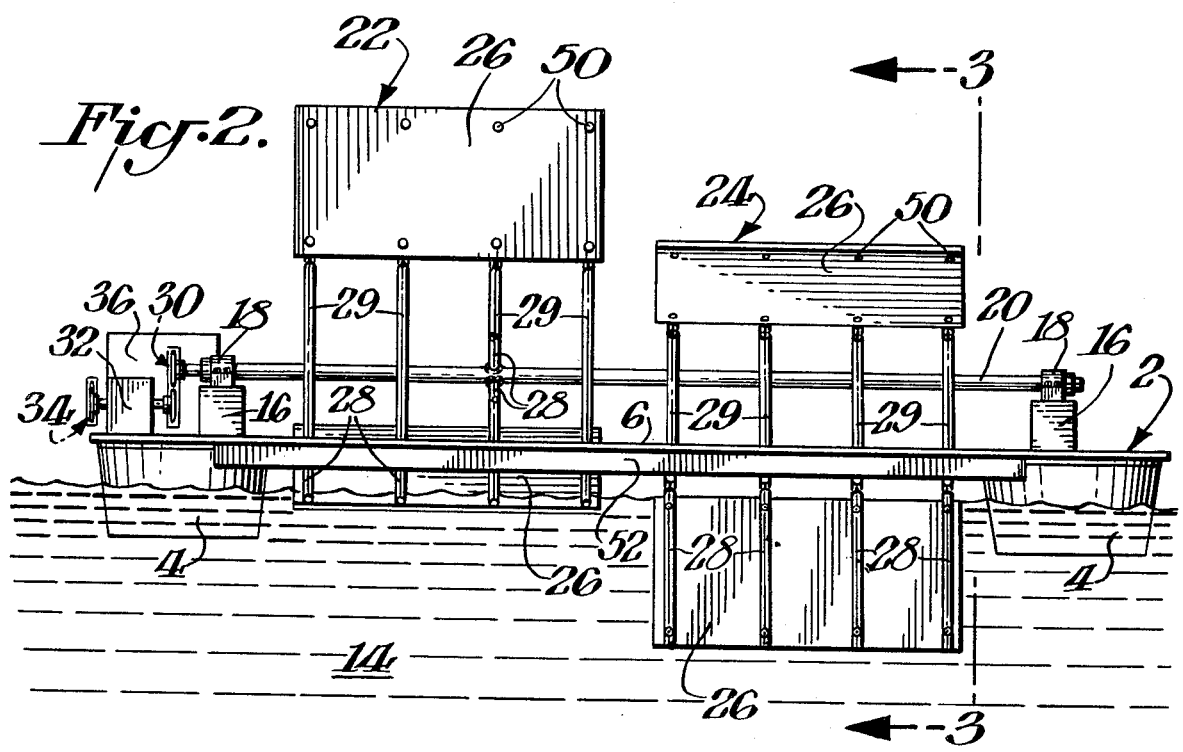
FIG. 2 is a front elevational view of the current motor of this invention.

Turning now to FIG. 2, the front elevational view of the current motor of this invention, the float 2 is shown supporting the drive shaft 20 and paddle assemblies 22 and 24 of fixed to the drive shaft. The paddle blades 26 are preferably positioned so that in their fully downwardly extended position, the blades extend downward through opening 12 and into the water 14 to a depth of the full width of the blade as shown. In a preferred embodiment, blades 26 are wooden and are affixed to aluminum tubes 28 and supported by aluminum support tubes 29. The blades are affixed to the tubes 28 by bolts 50. It is clear than many other materials can be used and would be suitable.

FIG. 3, an end elevation view of the motor of this invention taken along line 3—3 of FIG. 2, more clearly shows the angular relationship among the blades of each 3-bladed paddle assembly. The direction of current flow is shown to be right-to-left for illustrative purposes. In the position shown in FIG. 3, one of the blades 26 is shown in its vertical downward position and is under full power. In this position, the remaining two blades on the same 3-bladed paddle assembly are both out of the water. On the adjacent 3-bladed paddle assembly, one blade extends vertically upwardly, one is just entering the water and one is just leaving the water.

While it will be appreciated that the distance of the drive shaft above the water determines the water coverage of the blades, in the embodiment shown, which is preferred, approximately one and one-half to one and three fourths of the blades are always under power. This is a key advantage of the 3-bladed assembly of this invention. Prior, many-bladed current motors all suffer the disadvantage that power is wasted when one blade is located immediately or in close proximity behind another blade since: (1) little or no water flow reaches the rearward blade, and (2) power is lost in dragging the rearward blade(s) through and up out of the water. These disadvantages of prior current motors are obviated by the current motor of this invention.

FIG. 3 more clearly shows the supporting struts 29 which add rigidity to the structure.

Included for completeness in FIG. 3 are mooring pilings 10 and a pulley and counter weight system to provide for raising and lowering of float 2 during tidal changes. It will be appreciated that many other systems for anchoring float 2 in moving water may be utilized.

FIG. 4 shows, in diagrammatic view, the angular relationship among the blades of the current motor of this invention. Paddle assembly 22 is shown having solid lines connecting drive shaft 20 and blades 26. Paddle assembly 24 is shown having dotted lines connecting shaft 20 and blades 26. It can be seen that the angle formed between each blade and each other blade on each assembly is 120 degrees. Moreover, the blades on adjacent assemblies are positioned as shown such that the blades on one assembly bisect the angles formed by the blades on the adjacent assembly. Substantially these angular positions are key elements to this invention and are critical to its successful performance.

A current motor according to the above specifications was tested in the Appoquinimink Creek near Odessa, Del. In those tests, the float 2 measured 18 feet by 18 feet, and had an 18-foot drive shaft mounted thereon. The creek was tidal. Each blade 26 measured 4 feet by 8 feet, and was made of wood and bolted to aluminum struts 28 having aluminum support struts 29, all affixed to drive shaft 20. The drive shaft 20 was located 3 feet above the water, and each blade in its lowermost position extended its full width into the water. No power measuring apparatus was available, but it was observed that this unit provided approximately one and one-quarter revolutions per minute of drive shaft 20 producing enough power such that two men could not stop the shaft by hand. It will be appreciated that the power produced will depend upon the dimensions of the unit employed and the strength of the current in a given situation. The above example is provided merely for illustration.

In one series of tests, water dripping from blades 26 fell onto shaft 20 ad froze thereon, causing the shaft to slow and eventually stop. This problem could be eliminated by placing simple resistance heating elements in drive shaft 20.

If a body of water permits, it will also be appreciated that multiple assemblies of pairs of 3-bladed paddle assemblies can be employed to increase the amount of power generated. Additional pairs of units are required, rather than simply adding one additional 3-bladed assembly to the above-described pair, to maintain proper balance of the system.

It is specifically contemplated that large units like those described herein could be mounted upon barges and used in the Gulf Stream to generate large amounts of power.

While the invention herein has been disclosed with reference to certain particular preferred embodiments for illustrative purposes, it will be recognized that variations and modifications of the disclosed apparatus can be made without deviating from the gist of the invention, and such variations and modifications are deemed to fall within the scope of the claims below.

I claim:
1. An undershot current motor comprising:
a float or barge adapted to be moored on the surface of moving water and having an opening vertically through the center thereof,
support means on said float for supporting a horizontal, rotatable drive shaft above said water over said opening, the drive shaft extending transversely to the direction of water flow,
a horizontal drive shaft rotatably supported above said water by said support means,
at least two sets of 3-bladed paddle assemblies affixed to said drive shaft, each paddle assembly comprising 3 blades and each blade extending lengthwise along said drive shaft and radially outwardly from said drive shaft, each blade in each assembly being positioned substantially 120 degrees from each other blade, and said blades in each said set being positioned so that they bisect the angles formed by the blades in an adjacent set,
the blades extending through said opening and into said water during a portion of each revolution of said paddle assemblies and drive shaft,
said drive shaft being connected to, in appropriate sequence, an optional gear box, an optional electrical generator, and thence to a power takeoff device such that, when moored on moving water, the water causes the paddle assemblies and drive shaft to rotate, thereby generating power at said power takeoff.

2. The current motor of claim 1 wherein said paddle assemblies are each comprised of struts affixed to said drive shaft and extending outwardly therefrom and having paddle blades affixed to the outer ends of said struts.

3. The current motor of claim 1 wherein said moving water is tidal water and said gear box is reversible.

4. The current motor of claim 1 wherein said moving water is tidal water.

5. The current motor of claim 1 wherein said moving water is continuously flowing as in a river or stream.

6. The current motor of claim 1 wherein said moving water is continuously flowing ocean water as the Gulf Stream.

7. The current motor of claim 1 connected to an electrical generator.

8. The current motor of claim 1 connected to mechanical means for moving water for irrigation.

* * * * *